April 22, 1969   R. E. SMITH ETAL   3,440,473
LAMP FILAMENT JOINT FOR INCANDESCENT LAMPS
Filed Dec. 14, 1966

RAYMOND T. FLEMING
RICHARD E. SMITH
INVENTORS

BY *Joseph Ryan*
ATTORNEY

United States Patent Office 3,440,473
Patented Apr. 22, 1969

3,440,473
LAMP FILAMENT JOINT FOR INCANDESCENT LAMPS
Richard E. Smith, Lexington, and Raymond T. Fleming, Winchester, Ky., assignors to Sylvania Electric Products Inc., a corporation of Delaware
Filed Dec. 14, 1966, Ser. No. 601,721
Int. Cl. H01j 1/88, 19/42; H01k 1/18
U.S. Cl. 313—271                4 Claims

ABSTRACT OF THE DISCLOSURE

A projector lamp mount structure in which each of the coiled end segments is slipped over a spud and urged into abutting relationship against a flat formed in said spud intermediate the ends thereof.

---

Figure 1:
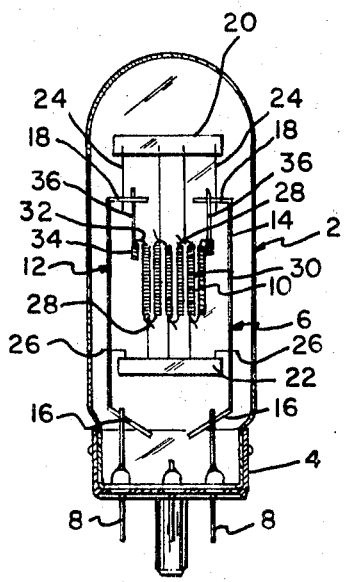

This invention relates to the manufacture of projector lamps and more particularly to the coil mount structure thereof.

In one form of projector lamp the light source comprises a plurality of substantially parallel segments of coiled tungsten filament wire. The adjacent ends of adjacent coil segments are connected to one another by a loop formed in the filament wire. These loops are hung on hooks, which comprise part of the mount structure, in order to support the coil in position. Each projector lamp coil is usually provided with a pair of end segments, somewhat shorter than the several intermediate segments which comprise the light source. Each end segment is usually threaded over the free end of a spud and then secured thereto, as by welding for example, to thereby complete the supporting arrangement for the coil.

One of the most important controls which must be exercised in the manufacture of electric lamps is the maintenance, within very close tolerances, of substantially uniform effective electrical length of the coil from lamp to lamp in order to obtain substantially uniform lamp characteristics. Different lamp types and different coil types present different problems in this regard, and thus different techniques have been employed to resolve them.

In the manufacture of projector lamps having a coil of the type described above, the effective electrical length of the coil is a function of the spud-end segment junction, i.e., the point at which the end segment and the spud are connected to one another electrically. Heretofore control over the exact locus of each such junction has been very difficult to exercise. In one case, one of the upper turns of an end segment might frictionally engage its spud sufficiently to establish a terminus electrically for this end of the coil. On the other hand, in another case, there may be no such frictional engagement and the weld or crimp which secures the members to one another physically may well define the electrical end of the coil—and the locus of the weld or crimp with respect to the number of turns which the end segment has, might also vary. All of these factors tend to compound this problem.

In view of the foregoing one of the principal objects of this invention is to provide projection lamps with a mount structure which will insure the attainment of substantially uniform lamp characteristics.

Another object of this invention is to provide projection lamps with a mount structure which will insure the attainment of substantially uniform electrical length of the coils from lamp to lamp.

A further object of this invention is to provide a projection lamp with a mount structure in which the spud-end segment electrical junction is the same from lamp to lamp.

These and other objects, advantages and features are attained, in accordance with the principles of this invention, by providing the spud on which the end segment is disposed with a stop against which the first turn of each end segment abuts. Thus, when an end segment is slipped over its spud until the uppermost turn thereof abuts the stop, the locus of the effective electrical end of all coils will always be the same—the point at which the uppermost turn of the end segment bears against the stop.

In the specific embodiment of the invention illustrated in the accompanying drawing, FIGURE 1 is a front elevational view partly in section of a projection lamp embodying the principles of this invention.

Figure 2:
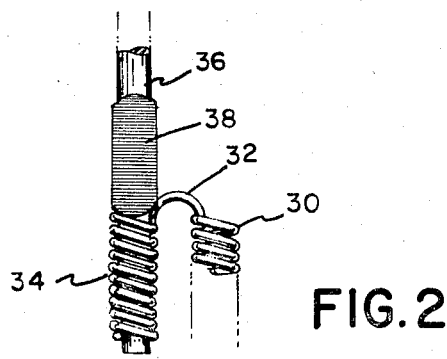

FIGURE 2 is a fragmentary detail on an enlarged scale of the spud-end segment junction employed in the FIGURE 1 embodiment.

Referring now to the accompanying drawing, the particular projector lamp with which a specific embodiment of this invention may be employed comprises an hermetically sealed light-transmitting envelope 2 having a base 4 secured to one end thereof and a mount 6 disposed therein. The mount 6 is supported on lead-in pins 8 extending through the bottom of the lamp envelope 2 and the base 4.

The mount 6 comprises a coil 10 and a supporting framework 12 therefor. The supporting framework 12 comprises a pair of side rods 14 having inwardly turned legs 16 at the lower extremities thereof and inwardly turned legs 18 at the upper extremities thereof. The legs 16 are attached to lead-in pins 8 to provide mechanical support for the mount structure and to electrically connect the coil 10 to an external source of electrical energy.

The supporting framework 12 includes an upper glass cane bridge 20 and a lower glass cane bridge 22, the former being mounted on supports 24 attached to the upper legs 18 of side rods 14 and the latter having supports 26 extending therefrom and attached to the side rods 14. Each bridge 20, 22 supports a plurality of hooks 28 on which the coil 10 is suspended.

The coil 10 is formed from a continuous length of tungsten wire shaped to provide a plurality of substantially parallel coiled segments 30 connected to one another by loops 32 through which the above-mentioned hooks 28 extend to support the coil segments. The ends of the tungsten wire are shaped to define end segments 34 which are secured to support wires or spuds 36 attached to and depending from the upper legs 18 of side rods 14. The end segments 34 are usually attached to the spuds 36 by welding or crimping for example.

As is well appreciated by those skilled in the art and as noted above, when the end segments 34 are slipped onto the spuds 36 and secured thereto, one is never sure which particular turn of any given end segment will be the uppermost one to contact the spud sufficiently to establish electrical contact therewith and thus define the electrical end of the coil. In accordance with the principles of this invention, this uncertainty is obviated by providing each spud with a stop which defines a bearing surface against which the uppermost turn of each end segment may be caused to bear as it is slipped onto the spud. Thus the effective electrical length of all coils are the same because the ends of each are the uppermost turns of the end segments. In the specific embodiment this stop takes the form of a flat 38 formed in each spud 36 near the lower end thereof.

Thus, in accordance with the principles of this invention, an end segment is slipped over its spud 36 until the uppermost turn thereof encounters the flat 38. Preferably a slight load is placed on the end segment by moving it up a little further on the spud, after this initial contact between the uppermost turn of the end segment and the flat has been established, in order to insure a firm positive frictional engagement of the members at this particular locus. The end segment is then welded or otherwise secured to the spud. No matter where this securing is effected, the locus of the effective electrical end of the coil will always be the same—the point at which the uppermost turn of the end segment bears against the flat.

While there has been shown and described what is at present considered the preferred embodiment of the invention, it will be obvious to those skilled in the art that various changes and modifications may be made therein without departing from the invention as defined by the appended claims.

What we claim is:
1. A projector lamp mount structure comprising:
an incandescent coil having a plurality of substantially parallel spaced coiled segments connected to one another by loops and having coiled end segments;
and a spud over which each end segment is slipped, said spud having a flat formed therein intermediate the ends thereof and the uppermost turn of said end segment firmly abutting and bearing against said flat.

2. The combination of claim 1 in which said end segments are under compression.
3. The combination of claim 1 in which said end segments are attached, intermediate their ends, to said spuds.
4. The combination of claim 2 in which said end segments are attached, intermediate their ends, to said spuds.

References Cited
UNITED STATES PATENTS

| | | | |
|---|---|---|---|
| 2,449,679 | 9/1948 | Van Horn | 313—344 X |
| 2,961,568 | 11/1960 | Pertwee | 313—344 X |
| 3,069,582 | 12/1962 | Reilly et al. | 313—271 |
| 3,189,778 | 6/1965 | Brundige | 313—344 X |

JOHN W. HUCKERT, *Primary Examiner.*

R. F. POLISSACK, *Assistant Examiner.*

U.S. Cl. X.R.

313—115, 272, 273, 279, 315, 341, 344